(12) United States Patent
Aleksa et al.

(10) Patent No.: US 11,708,014 B2
(45) Date of Patent: Jul. 25, 2023

(54) HEAD RESTRAINT SYSTEM FOR A SEAT

(71) Applicant: Adient Engineering and IP GmbH, Burscheid (DE)

(72) Inventors: James L. Aleksa, Livonia, MI (US); Amol Patil, Maharashtra (IN); Bhushan Murgude, Maharashtra (IN); Roger L. Meyerink, South Lyon, MI (US); Gaurav Chaudhary, Uttar Pradesh (IN)

(73) Assignee: Adient US LLC, Plymouth, MI (US)

( * ) Notice: Subject to any disclaimer, the term of this patent is extended or adjusted under 35 U.S.C. 154(b) by 0 days.

(21) Appl. No.: 17/444,606

(22) Filed: Aug. 6, 2021

(65) Prior Publication Data
US 2023/0039241 A1 Feb. 9, 2023

(51) Int. Cl.
*B60N 2/80* (2018.01)
*B60N 2/803* (2018.01)

(52) U.S. Cl.
CPC ........ *B60N 2/803* (2018.02); *B60N 2002/899* (2018.02)

(58) Field of Classification Search
CPC .......................... B60N 2/803; B60N 2002/899
See application file for complete search history.

(56) References Cited

U.S. PATENT DOCUMENTS

| | | | | |
|---|---|---|---|---|
| 6,149,233 A | * | 11/2000 | Takei | B60N 2/847 297/391 |
| 8,721,001 B2 | * | 5/2014 | Li | B60N 2/803 297/410 |
| 9,950,652 B2 | * | 4/2018 | Line | B60N 2/6009 |
| 10,150,394 B2 | * | 12/2018 | Kobayashi | B60N 2/80 |
| 10,207,615 B2 | * | 2/2019 | Toyomi | B60N 2/847 |
| 10,471,871 B2 | * | 11/2019 | Kober | B60N 2/809 |
| 10,569,684 B2 | * | 2/2020 | Fritsch | B29C 65/48 |

* cited by examiner

*Primary Examiner* — Philip F Gabler
(74) *Attorney, Agent, or Firm* — Marshall & Melhorn, LLC

(57) ABSTRACT

A head restraint system may have a head restraint retainer with a first surface adapted to support a cushioning material, and a second surface opposite the first surface. The second surface may have a selectively biased clip and at least one leg. The system may also have a panel with a clip port adapted to selectively retain the clip and at least one leg port adapted to selectively retain the at least one leg. A seat having a head restraint system and a method for connecting the components of the system are also provided.

8 Claims, 5 Drawing Sheets

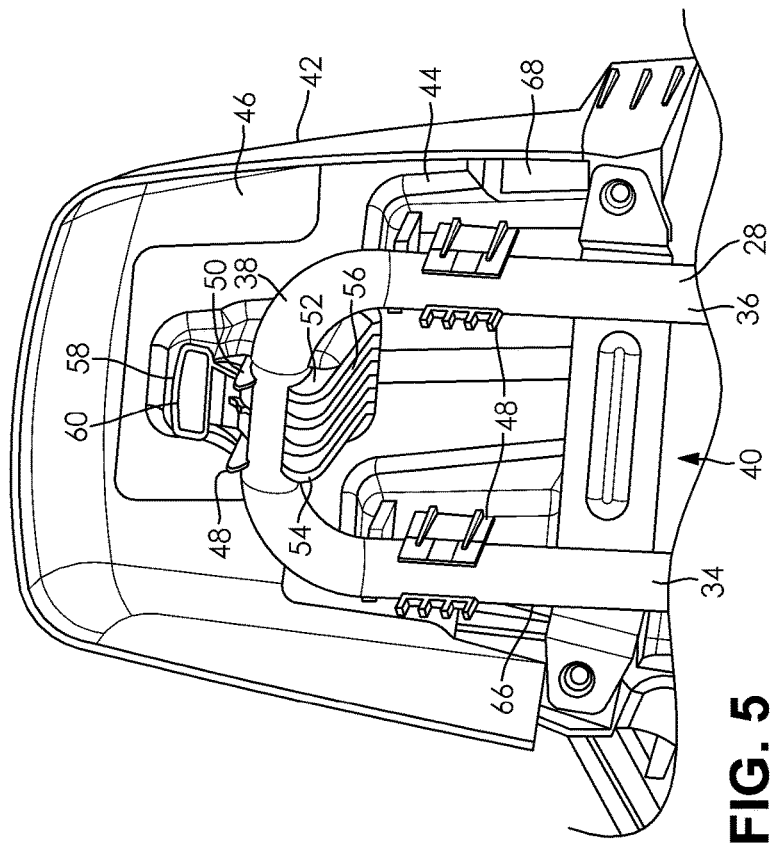

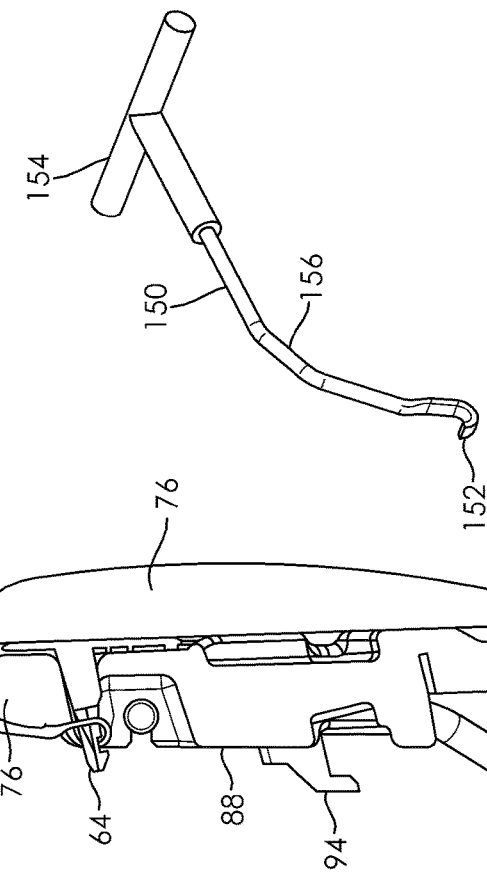
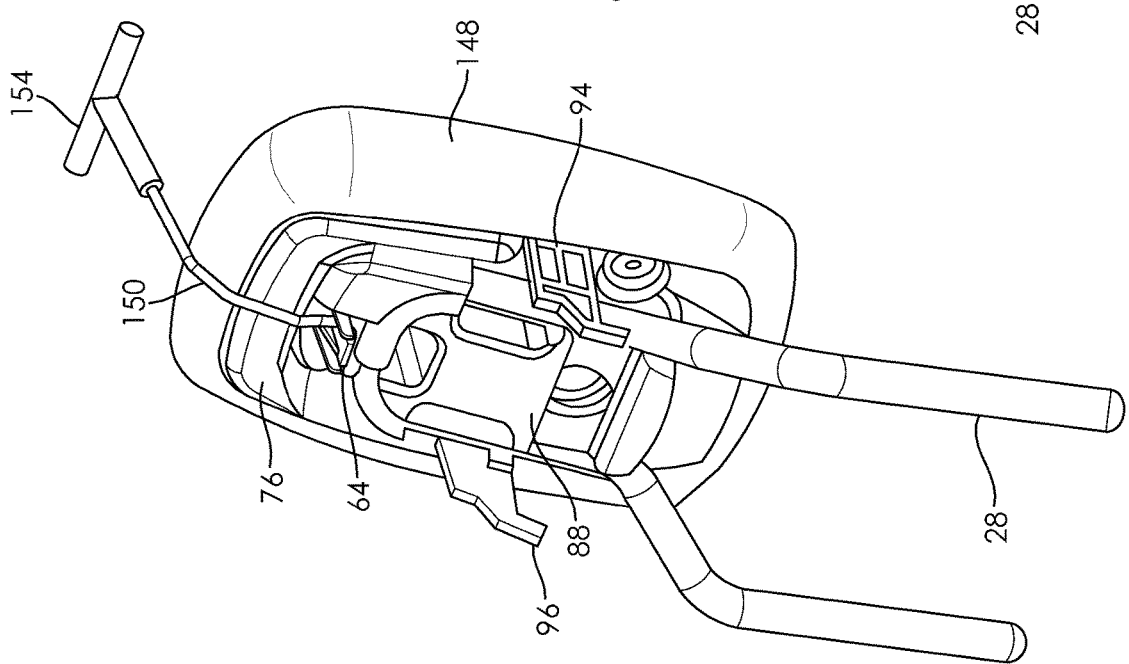
FIG. 9  FIG. 10  FIG. 11

HEAD RESTRAINT SYSTEM FOR A SEAT

FIELD

A head restraint system for a seat, such as for a vehicle seat, is provided. The system may be removable and replaceable.

BACKGROUND

Head restraints, which are also called headrests, are a comfort and safety feature commonly associated with seats, such as vehicle seats. In some cases, the head restraints are connected to an upper portion of the seat, such as the backrest. As a safety feature in vehicles, head restraints generally are designed to prevent or limit rearward movement of the seat occupant's head in whiplash-type events. As a comfort feature, head restraints provide a structure upon which an occupant may lean their head against.

In some cases, it is desirable to remove and replace a head restraint. This could be for a variety of reasons including, but not limited to, comfort, style, performance, safety, and/or function of the seat and/or restraint.

Current designs, however, make it difficult to remove a head restraint. Some prior art designs secure the parts of the head restraint together, or to parts of the seat, with fasteners that cannot be easily reached. Other designs require high forces and/or special tools to remove the head restraints, which can undesirably result in damage to the restraint or the seat.

Another disadvantage associated with the prior art designs is that a particular head restraint might not work well in a particular application or for a particular seat occupant, but because of the difficulty in changing it, the restraint is not changed, which could to lead to safety and/or comfort issues, or simply not using the vehicle.

In view of the disadvantages associated with the prior art designs, it would be advantageous for a head restraint to be easily removed and/or replaced to accommodate different seat occupants and different situations.

SUMMARY

In one aspect, a head restraint system may have a head restraint retainer having a first surface adapted to support a cushioning material, and a second surface opposite the first surface. The second surface may have a selectively biased clip and at least one leg. The system may also have a panel having a clip port adapted to selectively retain the clip and at least one leg port adapted to selectively retain the at least one leg.

In another aspect, the first and second surfaces may be part of a plate.

In another aspect, the selectively biased clip may extend from a central location on the second surface and may have a pivotable finger with a hook thereon located between two fixed fingers.

In another aspect, the pivotable finger may have an upper surface and a lower surface. The lower surface may be defined by an outer, downwardly extending lip and an inner, downwardly extending lip. The lips may be separated by a raised planar portion.

In another aspect, the second surface has a first and a second leg extending cantilevered and generally transverse from the second surface. The legs may extend on either side of the selectively biased clip. Each leg may have an extension portion and a hook portion. The hook portion may extend at a downward angle with respect to the extension portion.

In another aspect, the panel may have an inner and an outer wall. The inner wall may have the clip port located above and between a first leg port and a second leg port.

In another aspect, the plate of the head restraint retainer may be located between a forward shell and a rear shell. The clip and the at least one leg may extend through apertures in the rear shell.

In another aspect, a trim cover may be located over the forward shell.

In another aspect, a seat may have a head restraint system with a lower cushion portion, a back portion, a head restraint retainer connected to the back portion, and panel. The head restraint retainer may have a selectively biased clip and at least one leg. The panel may be connected to the back portion and it may have a clip port adapted to selectively retain the lip and a leg port adapted to selectively retain the leg.

In another aspect, the clip and the at least one leg are adapted to extend through apertures for each in a rear shell, and an aperture created by a head restraint rod extending from the back portion, to reach the clip port and the leg port, respectively, in the panel.

In another aspect, at least a portion of the head restraint rod snaps into receivers in the back portion.

In another aspect, a head restraint retainer may have a first surface adapted to support a cushioning material, and a second surface, opposite the first surface, the second surface having an upper, selectively biased clip located between two lower, fixed legs.

In another aspect, the selectively biased clip may be cantilevered from a central location on the second surface and may have a pivotable finger with a hook thereon located between two fixed fingers.

In another aspect, the pivotable finger may have an upper surface and a lower surface. The lower surface may be defined by an outer, downwardly extending lip and an inner, downwardly extending lip, where the lips may be separated by a raised planar portion.

In another aspect, the legs may be cantilevered and extend generally transversely from the second surface. Each leg may have an extension portion and a hook portion. The hook portion may extend at a downward angle with respect to the extension portion.

In another aspect, a method of connecting a head restraint system may include initially inserting at least one leg of a head restraint retainer to a leg port of a stationary panel through a combined pivot and downward motion of the head restraint retainer with respect to the stationary panel to secure a lower portion of said head restraint retainer to the stationary panel. The method may also include subsequently inserting a selectively biased clip on the head restraint retainer into a clip port of the stationary panel to secure an upper portion of the head restraint retainer into the stationary panel.

BRIEF DESCRIPTION OF THE DRAWINGS

Advantages of the system will become readily apparent to those skilled in the art from the following detailed description when considered in the light of the accompanying drawings in which:

FIG. 4 is a partial, cutaway side view of one embodiment of two components of the system;

FIG. 5 is a partial, front view of one embodiment of two components of the system;

FIG. 9 is a rear, perspective view of one embodiment of a head restraint tool and the system;

FIG. 10 is a cut-away side view of FIG. 9; and

FIG. 11 is a side view of the head restraint tool in FIG. 9.

DETAILED DESCRIPTION

It is to be understood that the system may assume various alternative orientations and step sequences, except where expressly specified to the contrary. It is also to be understood that the specific devices and processes illustrated in the attached drawings, and described in the following specification are simply exemplary embodiments of the concepts defined in the appended claims. Hence, specific dimensions, directions or other physical characteristics relating to the embodiments disclosed are not to be considered as limiting, unless the claims expressly state otherwise.

Figure 1:
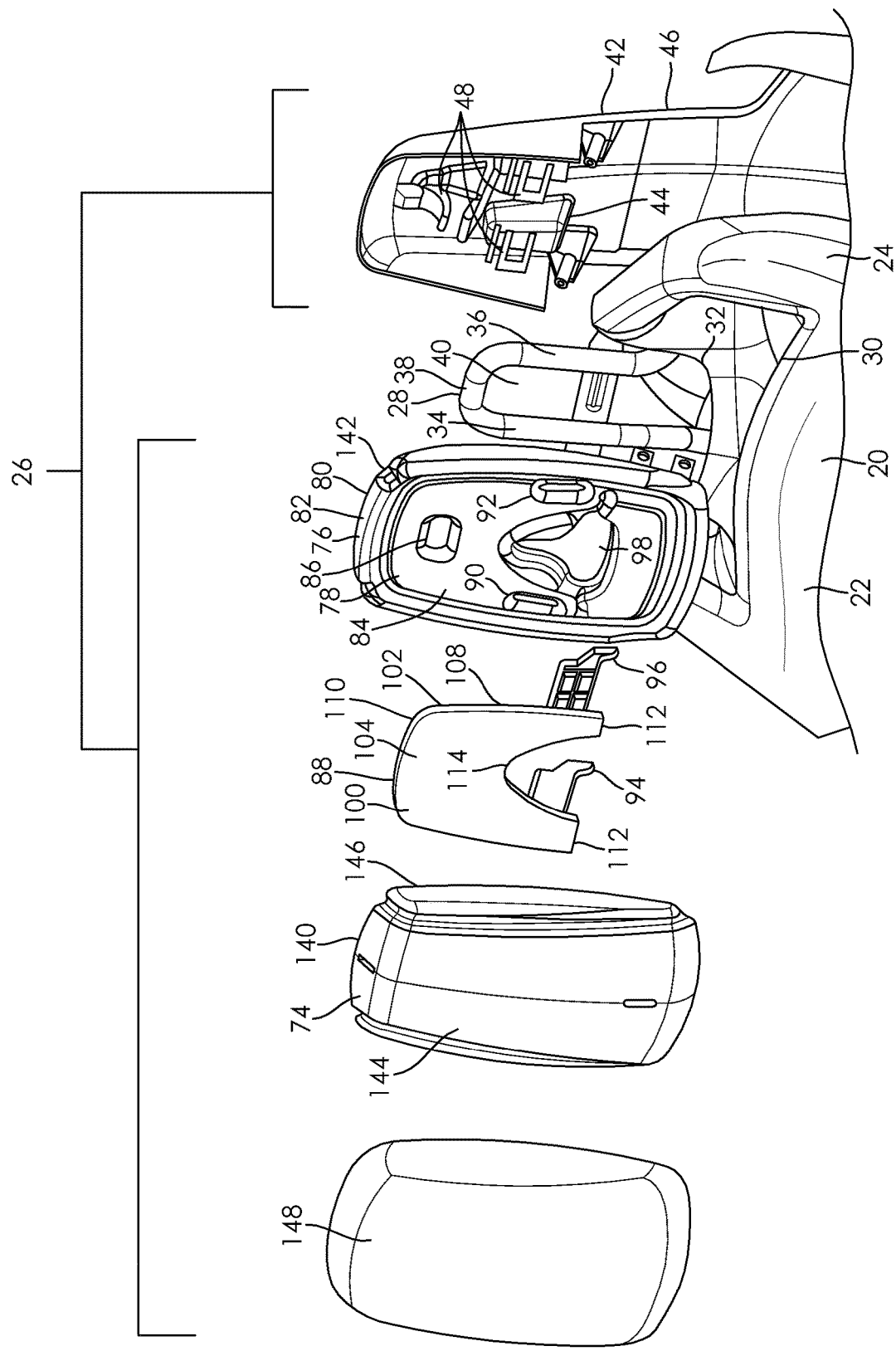
FIG. 1 is an exploded perspective view of one embodiment of a head restraint system.
Figure 2:
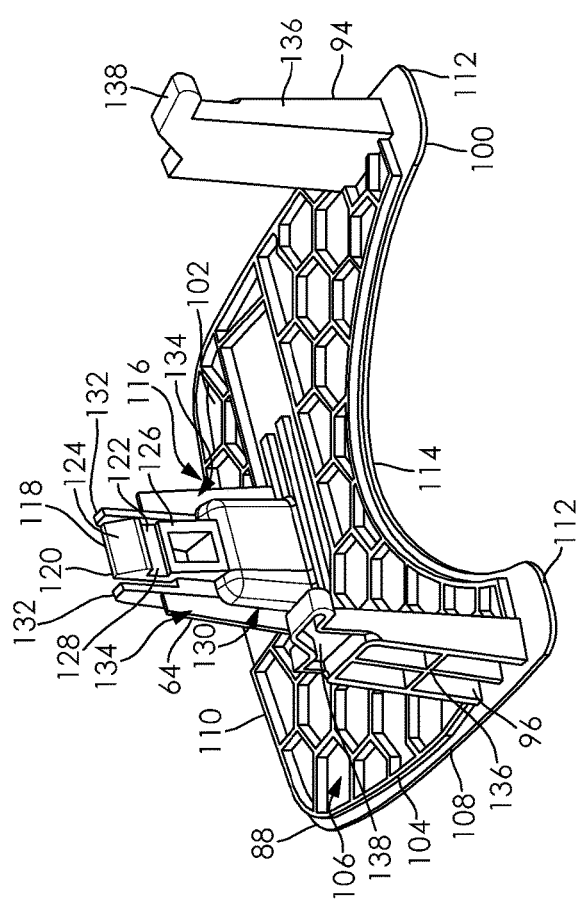
FIG. 2 is a rear, perspective view of one embodiment of a component of the system.
Figure 3:
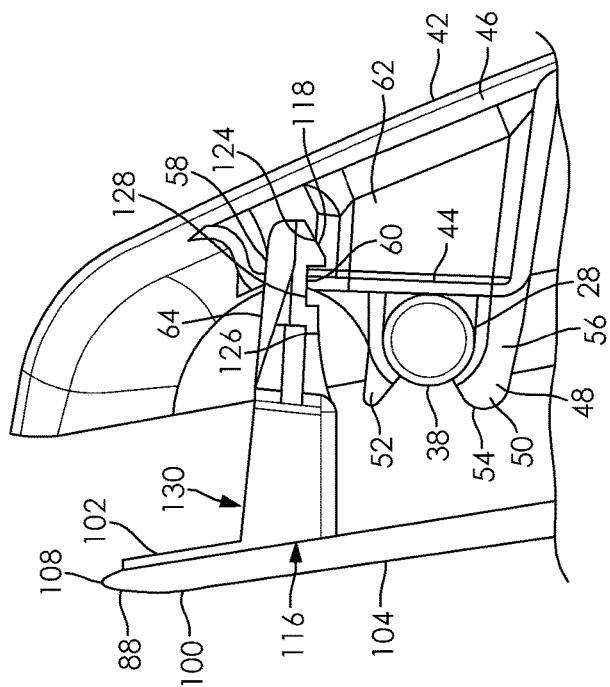
FIG. 3 is a partial, cutaway side view of one embodiment of two components of the system.
Figure 6:
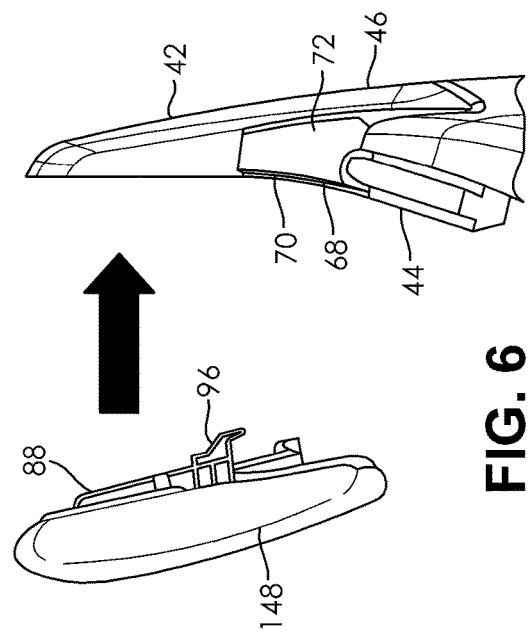
FIG. 6 is a partial, exploded side view of one embodiment of two components of the system.

Turning now to FIG. 1, one embodiment of a seat 20, which may be for a vehicle (not shown) is depicted. While use with a vehicle is mentioned, the seat 20 may be used in other applications. The seat 20 may have a lower seat cushion (not shown) and a seat back cushion 22. The cushions 22 may have almost any shape or size. Frames (not seen) may be associated with both cushions 22 to provide support and shape to the cushions 22. The frames may be connected together and at least one of them may be connected to a substrate, such as a floor (not shown) in a space in which the seat 20 is located, including in a vehicle floor.

One or both of the cushions 22 may be provided with a covering 24. The covering 24 may serve multiple purposes. In some cases, the covering 24 extends over the cushions 22 and the frame to enclose them. The covering 22 may also provide a comfortable, direct contact surface for the occupant, and also provide aesthetic details and finishes to the seat 20.

A head restraint system 26 may be connected to the seat back cushion 22. In one embodiment, the system 26 may be connected to a head restraint rod 28 of the seat 20. The rod 28 may or may not be part of the system 26. The head restraint rod 28 may be a separate component connected to the seat frame, or it may be part of the seat frame. In some embodiments, the head restraint rod 28 may extend through an opening 30 in the seat back cushion 22 and an opening 32 in the covering 24 for the seat back cushion 22.

The head restraint rod 28 may extend from the seat back cushion 22 in any direction, and the head restraint rod 28 may be of any shape or size. Further, the head restraint rod 28 may be formed of a single, unitary, integrally formed piece, or it may be comprised of several pieces that may be joined together. In one embodiment, the head restraint rod 28 may be such as a metallic tube or rod that has a first leg 34 and a second leg 36 that extend from the frame of the seat back cushion 22, and a transverse cross-piece 38 that connects the two legs 34, 36. The legs 34, 36 and the cross-piece 38 at least partially surround and define a head restraint rod aperture 40. In some embodiments, the head restraint rod 28 may have a circular cross-section.

The head restraint rod 28 may be adapted to be at least partially connected to a back panel 42. The back panel 42 may be of any shape or size. In some embodiments, the back panel 42 may be shaped and sized to at least partially enclose the head restraint rod 28. In other embodiments, the back panel 42 may extend partially or entirely along the seat back cushion 22.

FIGS. 1 and 3-8 depict one embodiment of a back panel 42. The back panel 42 may have, at least partially, an inner wall 44 and an outer wall 46. In some embodiments, the inner and outer walls 44, 46 may not extend along the entirety of the back panel 42.

The outer wall 46 may have, at least partially, a complementary shape to the seat back cushion 22. Further, the outer wall 46 may be at least partially complementary to the shape of the head restraint rod 28. The back panel 42 may be part of the system 26, or it may be separate therefrom. In some embodiments, the inner wall 44 of the back panel 42 may, at least partially, be spaced apart from the outer wall 46. The inner wall 44 may be at least partially complementary in shape and/or size to the outer wall 46. In other embodiments, the inner wall 44 may have a different shape and size compared to the outer wall 46.

Head restraint rod retainers 48 may be formed from or with the inner wall 44 and extend in the opposite direction from the outer wall 46. As best seen in the exemplary embodiment of FIG. 5, there may be one or more head restraint rod retainers 48. In the embodiment of FIG. 5, the retainers 48 may be spaced from one another about the back panel 42. In one possible arrangement, one retainer 48 may be adapted to be aligned with the cross-piece 38 of the head restraint rod 28, and two other retainers 48 may be adapted to be aligned with each of the legs 34, 36 of the head restraint rod 28.

Each retainer 48 may have its own size, shape and location, but generally the retainers 48 may be comprised of a jaw-like structure capable of receiving at least a portion of the head restraint rod 28 therein. The jaw-like structures may be comprised of two portions 50, 52, where each portion 50, 52 may be attached to the back panel 42. One or both of the portions 50, 52 may be at least partially curved, or otherwise have a partially complementary shape to at least part of the head restraint rod 28.

In some embodiments, outer edges 54 of the portions 50, 52 may be closer to each other than a body portion 56 of each portion 50, 52. In some embodiments, the outer edges 54 of some of the portions 50, 52 may have hook-like portions on them. The portions 50, 52 may assist in selectively retaining the head restraint rod 28. The portions 50, 52 may be constructed of an elastic material that permits them to selectively flex toward or away from one another, such as upon entry or removal of the head restraint rod 28. The retainers 48 may hold the head restraint rod 28 a predetermined distance from the back panel 42 so that a gap is present between the rod 28 and the back panel 42. In other cases, no gap is present.

Turning now to FIGS. 3, 4, 6, 7 and 8, one embodiment of the back panel 42 is provided, where one embodiment of the inner and outer walls 44, 46 of the back panel 42 may be seen. The figures show, how in one design, a clip port 58 is created between the inner and outer walls 44, 46. The clip port 58 may comprise an aperture 60 in the inner wall 44, and a void 62 between the inner and outer walls 44, 46. The clip portion 58 may have various sizes and shapes but it is preferably complementary to a clip 64 described below. In such a situation, the clip port 58 may be oval or rectangular in shape.

The figures also show, how in one design, at least one leg port is created by the inner and outer walls 44, 46. Preferably, at least a first leg port 66 and a second leg portion 68 are provided. Each leg port 66, 68 may comprise an aperture 70 in the inner wall 44 and a void 72 between the inner and outer walls 44, 46. The void 72 may be the same as that for the clip port, or it may be another one.

With continued reference to FIG. 1, the system 26 may be comprised of at least one shell member. In some embodiments, a front shell 74 and a rear shell 76 may be provided. The shells 74, 76 may be constructed of a variety of materials, and the two shells 74, 76 may be constructed of the same or different members. By way of example, the shells 74, 76 may be constructed of a foamed or expanded polyethylene, a foamed polypropylene, polystyrene, polyurethane, mixtures of the foregoing, and/or other related materials. As noted, the front shell 74 may be different than rear shell 76 and in one embodiment the front shell 74 may be comprised of a softer material, such as a softer polyurethane, than rear shell 76 for comfort.

The rear shell 76 may be any size or shape, but in some cases, it may be larger in height and width compared with the head restraint rod 28. Preferably, the rear shell 76 may have a generally rectangular or oval outer perimeter at least somewhat complementary to the head restraint rod 28.

The rear shell 76 may have a forward surface 78 and a rear surface 80. The forward surface 78 may have an upstanding rim 82 at least partially surrounding an inner portion 84. In some embodiments, as shown in FIG. 1, the rim 82 may entirely surround the inner portion 84 in a continuous fashion.

In the cases where the rim 82 stands out from the inner portion 84, the inner portion 84 may be sunken or depressed with respect to the rim 82. The inner portion 84 may be substantially planar, except for some depressions and/or apertures, such as mentioned below.

In one embodiment, the inner portion 84 may have a clip aperture 86 sized, shaped and located to selectively receive the clip 64 from a head restraint retainer 88. The clip aperture 86 may extend entirely through from the forward surface 78 to the rear surface 80 of the rear shell 76 so that the clip 64 may extend entirely through the clip aperture 86. In some embodiments, the clip aperture 86 may have an oval shape, so as to accommodate a clip 64 that is generally wider than it is tall, but other sizes and shapes may be used.

First and second leg apertures 90, 92 may be located in the inner portion 84 as well. The leg apertures 90, 92 may be located below the clip aperture 86, and adjacent the rim 82. The leg apertures 90, 92 may be sized, shaped and located to selectively receive a first leg 94 and a second leg 96 from the head restraint retainer 88. The first and second leg apertures 90, 92 may extend entirely through from the forward surface 78 to the rear surface 80 of the head restraint retainer 88 so that the first and second legs 94, 96 may extend entirely through the respective leg apertures 90, 92. In some embodiments, the leg apertures 90, 92 may have an oval shape, so as to accommodate legs 94, 96 that are generally taller than they are wide, but other sizes and shapes may be used.

The first and second leg apertures 90, 92 may be located on either side of a central aperture 98, which may be located approximately in the middle of the head restraint retainer 88. The central aperture 98 may be located below the clip aperture 86. The central aperture 98 may have many different sizes, shapes and locations, but in one embodiment, the central aperture 98 may have a generally triangular shape. The triangular shape may at least be partially complimentary to a portion of the head restraint retainer 88 shape.

In the situation where the rear shell 76 is constructed of expanded polypropylene, or the like, the rear shell 76 provides a medium between both the back panel 42 and the head restraint rod 28 and the head restraint retainer 88. The rear shell 76 may thus function as a lightweight, low density, highly elastic, low compressibility material with a high deformation recovery rate to provide a comfortable and safe surrounding and cover for the rod 28 and back panel 42.

The head restraint retainer 88 may have a first surface 100 adapted to support a cushioning material and a second surface 102 opposite the first surface 100. In some embodiments, the first and second surfaces 100, 102 may be part of a plate 104. Namely, the first surface 100 may be substantially planar. The second surface 102 may have patterning 106, such as ribs or the like, which may provide rigidity and strength to the retainer 88. The patterning 106 may cause the plate 10 to have varying thickness between the first and second surfaces 100, 102.

The first and second surfaces 100, 102 may be bounded by a perimeter 108 associated with the head restraint retainer 88. The perimeter 108 may generally form a truncated arrowhead shape with a rounded top 110 and two legs 112 separate by an arch portion 114. Other shapes and sizes of the retainer 88 may be permissible.

In some embodiments, the clip 64, which may be selectively biased, and the legs 94, 96 may be connected to the second surface 102. The clip 64 may extend from a generally central location 116 on the second surface 102, and extend in a generally transverse orientation.

The clip 64 may be comprised of a pivotable finger 118. The finger 118 may have an upper surface 120 and a lower surface 122. The lower surface 122 may be defined by an outer, downwardly extending lip 124 and an inner, downwardly extending lip 126. In some embodiments, the lips 124, 126 may be separated by a raised planar portion 128. The outer, downwardly extending lip 124, coupled with the raised planar portion 128, may form a hook-like structure.

An inner portion 130 of the clip 64 may be directly connected, such as integrally formed with, the second surface 102. In this embodiment, the clip 64 may be cantilevered from the second surface 102.

In some embodiments, the clip 64 may be located between two fingers 132. The fingers 132 may have an inner portion 134 that may be directly connected, such as integrally formed with, the second surface 102. The fingers 132 may be cantilevered from the second surface 102. The fingers 132 are generally fixed and not designed to move, but some movement is permissible.

At noted above, the second surface 102 may also have at least one leg extending therefrom. In some embodiments, a first and a second leg 94, 96 extending generally transversely from the second surface 102 may be provided. The legs 94, 96 may be located so that they extend from the second surface 102 but are lower and off to each side of the clip 64. Each leg 94, 96 may be integrally formed from the second surface 102 and cantilevered therefrom.

In some embodiments, each leg 94, 96 has an extension portion 136 and a hook portion 138. The extension portion 136 is connected to the second surface 102 and extends therefrom. The hook portion 138 may extend at a downward angle with respect to the extension portion 136. The downward angle may be between 45 and 90 degrees.

In some embodiments, the clip 64 may be adapted to selectively extend through the clip aperture 86 of the rear shell 76. The clip 64 may also selectively extend above the cross-piece 38 of the rod 28. The clip 64 may be adapted to selectively extend into the clip port 58 of the back panel 42. The outer lip 124 of the clip 64 may selectively engage the inner wall 44 to selectively retain the clip 64 within the clip port 58 and thus to the back panel 42.

Figure 8:
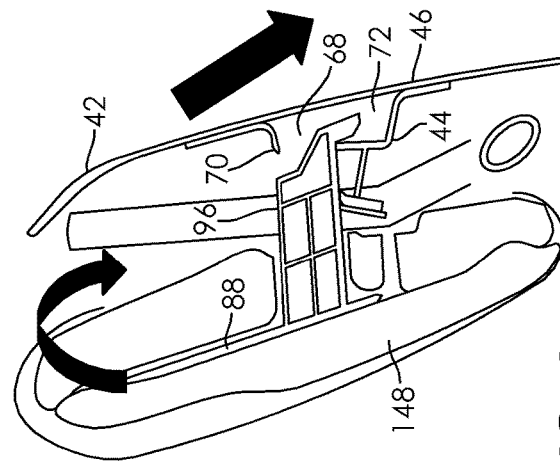
FIG. 8 is a partial, side view of the two components of the system from FIGS. 6 and 7 in a partial state of connection.
Figure 7:
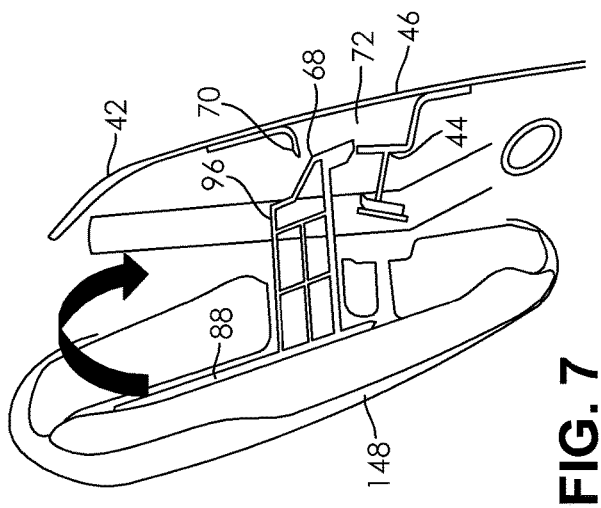
FIG. 7 is a partial, side view of the two components of the system from FIG. 6 in a partial state of connection.

From FIGS. 1, 4, 7 and 8, one embodiment of a connection of the legs 94, 96 for the head restraint retainer 88 to the back panel 42 may be appreciated. The legs 94, 96 may be adapted to selectively extend through the leg apertures 90, 92 of the rear shell 76. The legs 94, 96 may selectively extend either within or outside of the head restraint rod 28. As shown in FIG. 7, the head restraint retainer 88, and thus the legs 94, 96, may need to be initially angled with respect to the back panel 42 so that the hook portions 138 of the legs 94, 98 enter the leg ports 66, 68. Once the hook portions 138 enter the leg ports 66, 68, the angle between the head restraint retainer 88 and the back panel 42 may be decreased so that the hook portions 138 extend down into the voids 72. The head restraint retainer 88 can then be pushed toward, and perhaps at a downward angle as well, to the back panel 42, as shown in FIG. 8, so that the extension portions 136 extend into the leg ports 66, 68. Being so located, the head restraint retainer 88 is thus selectively secured to the back panel 42.

As noted above, the shell member may be provided with the front shell 74. In the situation where the front shell 74 is constructed of expanded polypropylene, or the like, the front shell 74 provides a medium between the head restraint retainer 88. The front shell 74 may thus function as a lightweight, low density, highly elastic, low compressibility material with a high deformation recovery rate to provide a comfortable and safe surrounding and cover head restraint retainer 88.

The front shell 74 may have a size and shape at least roughly complementary to the rear shell 76. In some embodiments, the front shell 74 may have a perimeter 140 that is complementary to the size and shape of a rear shell perimeter 142. The front shell 74 may have front and rear surfaces 144, 146, which together, or individually, provide a concave rear surface 146 and/or a convex front surface 144.

The front shell 74 may be connected to the rear shell 76 and/or the head restraint retainer 88. The connection may be fixed or temporary. The connection may be comprised of one or more of mechanical fasteners, adhesives, hook and loop fasteners, stitching/sewing, male/female connectors, friction fits and/or similar or related coupling mechanisms.

In some embodiments, a head restraint trim cover 148 may be used to at least partially extend over at least the front shell 74. The cover 148 may also extend at least partially over at least a portion of the rear shell 76. FIG. 9 depicts one embodiment of the cover 148 extending over substantially entirely the front shell 74 and wrapping around at least about the upstanding rim 82 of the rear shell 76.

The cover 148 may be made of natural and/or synthetic materials, including but not limited to fabric, and/or open or close cell foam material. The cover 148 may be attached to the front 74 and/or rear 76 shell by mechanical fasteners, adhesives, hook and loop fasteners, stitching/sewing, male/female connectors, friction fits, elastic and/or similar or related coupling mechanisms. The cover 148 may provide an aesthetically pleasing and/or cushioning enclosure for the shell(s) 74, 76.

Turning now to FIGS. 9, 10 and 11, one embodiment for removing the head restraint retainer 88 from the back panel 42 is schematically depicted. In this embodiment, the cover 148, the front shell 74, the head restraint retainer 88, and the rear shell 76 are shown connected to the head restraint rod 28. A removal tool 150 is provided to selectively move the outer lip 124 on the pivotable finger 118 so that it clears the inner wall 44 of the clip port 58.

In one embodiment, the removal tool 150 may be moved into position so that a release lip 152 of the removal tool 150 is located under the outer lip 124. A handle portion 154 of the tool 150 may be pivoted, which biases the release lip 152 into the outer lip 124. The biasing direction of the outer lip 124 by the release lip 152 may be such as upward so that the outer lip 124 clears the inner wall 44 of the clip port 58.

The headrest system 26 can then be pulled up so that the hook portions 138 of the legs 94, 96 move toward the leg ports 66, 68. The headrest system 26 may also need to be pivoted away from the back panel 42 for the hook portions 138 and the legs 94, 96 to clear the leg ports 66, 68. The headrest system 26 can then be removed from the back panel 42.

The removal tool 150 may have a curved intermediate portion 156 that connects the handle portion 154 with the release lip 152. The release lip 152 may have a generally J-shaped cross-section. The shape of the intermediate portion 156 is designed to permit the tool 150 to be inserted between the back panel 42 and the rear shell 76 and/or the head restraint retainer 88, and for the tool handle portion 154 to clear the front shell 74 and the cover 148. While one embodiment of a removal tool 150 is mentioned, it may also be possible to use a different hand tool or pick to release the head restraint retainer 88.

In another embodiment, the headrest system 26 may have a feature integrated into the headrest system 26 that releases the outer lip 124 on the pivotable finger 118 so that a separate tool is not required. In such an embodiment, a strap, wire, cord and/or mechanical connection (including a lever) may be provided that connects the outer lip 124 to a portion on or outside of the front shell 74, the rear shell 76 or the cover 148. The release device may be selectively engaged, such as pulled or moved, so as to move the outer lip 124 so that it clears the clip port 58 and the headrest system 26 can be removed from the back panel 42, as described above.

In other embodiments, one or more of the structures on the head restraint retainer 88 may be provide on the back panel 42, and one or more of the structures on the back panel 42 may be located on the head restraint retainer 88. By way of example, the at least one leg 94 or 96 of the head restraint retainer 88 may be located on the back panel 42. And, at least one leg port 66, 68 of the back panel 42 may be located on the head restraint retainer 88. Further, the clip 64 on the head restraint retainer 88 may be located on the back panel 42 and the clip port 58 on the back panel 42 may be located on the head restraint retainer 88.

In accordance with the provisions of the patent statutes, the device has been described in what is considered to represent its preferred embodiments. However, it should be noted that the device can be practiced otherwise than as specifically illustrated and described without departing from its spirit or scope.

What is claimed is:
1. A head restraint system, comprising:
a head restraint retainer having a first surface adapted to support a cushioning material, and a second surface opposite said first surface, said second surface having a selectively biased clip and at least one leg; and a panel comprising a clip port adapted to selectively retain said clip and at least one leg port adapted to selectively retain said at least one leg, wherein a front shell and the panel partially enclose the head restraint retainer, wherein the panel has at least one jaw for selectively receiving a head restraint rod, wherein a rear shell located between the front shell and the panel has apertures to receive the selectively biased clip and the at least one leg respectively therethrough.

2. The head restraint system of claim 1, wherein said first and second surfaces are part of a plate.

3. The head restraint system of claim 1, wherein said selectively biased clip extends from a central location on said second surface and has a pivotable finger with a hook thereon located between two fixed fingers.

4. The head restraint system of claim 3, wherein said pivotable finger has an upper surface and a lower surface, wherein said lower surface is defined by an outer, downwardly extending lip and an inner, downwardly extending lip, wherein said lips are separated by a raised planar portion.

5. The head restraint system of claim 1, wherein said at least one leg comprises a first and a second leg extending cantilevered and generally transverse from said second surface, said legs extending on either side of said selectively biased clip, wherein each leg has an extension portion and a hook portion, wherein said hook portion extends at a downward angle with respect to said extension portion.

6. The head restraint system of claim 1, wherein said panel has an inner and an outer wall, wherein said inner wall has a clip port located above and between said at least one leg port comprising a first leg port and a second leg port.

7. The head restraint system of claim 1, wherein said plate of said head restraint retainer is located between a forward shell and a rear shell, and said clip and said at least one leg extend through apertures in said rear shell.

8. The head restraint system of claim 7, wherein a trim cover is located over said forward shell.

* * * * *